United States Patent [19]

Schöllhorn et al.

[11] 4,425,389
[45] Jan. 10, 1984

[54] HEAT-APPLICABLE AND HARDENABLE SEALING COMPOSITIONS AND ITS USE

[75] Inventors: Wolf-Dietrich Schöllhorn, Grünstadt; Lothar Hockenberger, Ludwigshafen, both of Fed. Rep. of Germany

[73] Assignee: Rütgerswerke Aktiengesellschaft, Frankfurt am Main, Fed. Rep. of Germany

[21] Appl. No.: 408,571

[22] Filed: Aug. 16, 1982

[30] Foreign Application Priority Data

Aug. 28, 1981 [DE] Fed. Rep. of Germany ....... 3134151

[51] Int. Cl.³ .............................................. E06B 3/24
[52] U.S. Cl. .................................... 428/34; 156/107; 156/109; 156/104; 528/374; 528/375; 428/419; 525/535; 525/537
[58] Field of Search ................. 525/535, 537; 428/34, 428/419; 156/107, 109, 104; 528/374, 375

[56] References Cited

U.S. PATENT DOCUMENTS 3,316,194  4/1967  Payne et al. ........................ 525/535
4,165,425  8/1979  Bertozzi .............................. 528/374

Primary Examiner—Melvyn I. Marquis
Attorney, Agent, or Firm—Beveridge, DeGrandi & Kline

[57] ABSTRACT

A polysulfide sealing composition is described which contains, in addition to the hardening agents and optional fillers, softeners and other conventional additives, a mixture of a solid polysulfide rubber with terminal SH groups and a liquid polysulfide polymer with terminal SH groups, wherein the weight ratio of the respective solid and liquid polysulfide is 100:5 to 15. The composition may be used for the manufacture of insulating glass units.

7 Claims, No Drawings

HEAT-APPLICABLE AND HARDENABLE SEALING COMPOSITIONS AND ITS USE

The invention relates to a heat-applicable and hardenable sealing composition on the basis of polysulfide polymers.

Sealing compositions on the basis of liquid polysulfide polymers for permanently elastic sealing of cracks of all kinds have been sufficiently known for decades.

Such sealing compositions have been widely used in the production of insulating glass units.

In the simplest case, an insulating glass unit consists of two glass plates which are held by a continuous circumferential bridge or border at a certain distance and are connected by a permanently elastic mass between the glass plates and the bridge.

At the present time for the permanent elastic sealing of such insulating glass plates, predominantly two-component sealing masses on the basis of liquid polysulfide polymers are used. Prior to the application of the sealing composition, the component A of the composition with the hardening component B must be exactly proportioned and homogenously mixed. This may be accomplished either by a manual process as well as with suitable apparatus. Absolutely necessary for both processes however is a sufficiently long pot-life of the sealing composition. Because of technical reasons of fabrication, it should be between 30 and 90 minutes. The tack-free curing then takes place after 3 to 9 hours at ambient temperature.

Another system which does not require these curing times is a system for gluing together insulating glasses with the help of the so-called "hot-melt" compositions on the basis of the thermoplastic butyl rubber. The general disadvantage of such "hot-melt" sealing compositions is to be seen in the reversible solidification and in the plastic behavior of such compositions. The softening of the gap between the plates with an increase of temperature and as a result of that the danger of a possible shifting of the individual glass panes toward each other produces a danger which should not be underestimated.

Desirable for the producer of insulating glass units is therefore a composition which possesses the good characteristics of polysulfides polymers which, however, may be processed analogously to the thermoplastic mass and using the same machines used to process thermoplastics.

In European Pat. No. 0006698, European Pat. No. 0008845 and U.S. Pat. No. 4,165,425, hot-applicable compositions are described on the basis of liquid polysulfide polymers. In all three cases, precross-linked, solid polymer products are produced from liquid polysulfide polymers with terminal SH groups, which at temperatures of 150° C. to 200° C. become liquid for a short time and harden immediately and irreversibly. These products have the disadvantage that they cannot be processed at a low temperature level, such for example 100° C.

It is therefore a feature of the invention to provide a sealing composition on the basis of polysulfide polymers which may easily be sprayed at temperatures of about 100° C. and may be maintained in this state for a prolonged period of time. In the case of working at higher temperatures, an irreversible curing to a rubber-elastic material should then take place.

The obtaining of the feature of this invention is accomplished by a hot-applicable and hardenable sealing composition on the basis of polysulfide polymers with the additional use of hardening agents and, optionally, of fillers, softeners, adhesive agents, dyestuffs, stabilizers, accelerators, retarders, characterized in that a mixture of solid polysulfide rubber and of terminal SH groups and a liquid polysulfide polymer with terminal SH groups is used in a weight ratio of 100:5 to 15.

As liquid polysulfide polymers to be used in accordance with the invention, oligomers or polymers can be used having the general formula:

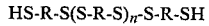

$$HS-R-S(S-R-S)_n-S-R-SH$$

wherein R is a lower alkyl group or an alkyl ether group, preferably the group $-CH_2CH_2OCH_2OCH_2CH_2-$ and n is an integer of about 6 to 25. These products have an average molecular weight of about 800 to 4,000. They are liquid at room temperature, having average viscosities at 20° C. of about 80 mPa.s to 5,000 mPa.s.

As solid polysulfide rubbers to be used in accordance with the invention, polymers can be used having the general formula:

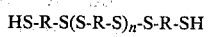

$$HS-R-S(S-R-S)_n-S-R-SH$$

wherein R is a lower alkyl group or an alkyl ether group, preferably the group $-CH_2CH_2OCH_2OCH_2CH_2-$ and n is an integer of about 300 to 1,000. These products have an average molecular weight of about 50,000 to 200,000. They are solid rubbers, having no defined melting or softening point.

Mixtures of solid mercaptoterminal polysulfide rubbers and liquid mercaptoterminal polysulfide polymers have been known. They are used in the rubber industry for the production of highly solvent resistant articles. For that purpose, the mixtures which also contain fillers and hardening agents are molded and cured in the vulcanization installations customary in the rubber industry at temperatures from 145°–160° C.

However, it has not been known that by mixing of mercaptoterminal polysulfide rubbers with mercaptoterminal liquid polysulfide polymers, one could produce compositions which have such pastelike qualities in the temperature range of about 100° C. that they may be sprayed with application devices customary in the sealing material art. It has been determined completely unexpectedly that a solid, not thermoplastic polysulfide rubber with terminal SH groups is transformed into a material which exhibits thermoplastic behavior by incorporating therein from 5 to 15% by weight of liquid polysulfide polymers.

Sealing compositions produced from this mixture represent a one-component system, since the corresponding hardening agent is immediately worked into it with the remainder. The hardening or oxidation of terminal SH groups into S-S-groups takes place, however, only at an elevated temperature. At 50° C. to 100° C., the compositions remain soft to such a point that they may be pumped and easily sprayed. The processibility of the compositions at 100° C. is guaranteed for several hours, whereas the processibility at 140° C. to 160° C. amounts to only a few minutes. As an oxidation agent, the combination of p-quinone dioxime and zinc oxide known per se has proven itself useful particularly with regard to good storage stability of the compositions.

Other, so-called latent hardening agents, which oxidize the mercapto groups only at elevated temperature, such as for example zinc peroxide, organic hydroperoxides, furfurole or aromatic nitro compounds may also be used as hardeners, optionally with additional accelerators individually or combined.

The amount of the oxidation agents used depends on the SH content of the polysulfide mixture. It must be guaranteed that all SH groups can be oxidized. Generally therefore, one will use an excess of about 25-50% beyond the stoichiometrically necessary quantity of oxidation agent.

To these mixtures of polysulfide rubber, polysulfide polymer and oxidation agent there may be added, according to selection, also a filler (chalks, carbon black, heavy spar, silicates and others), plasticizers (phthalates, chlorinated parafins and others), pigments, adhesive agents, stabilizers, accelerators and retarders, in order thus to produce the compositions with the desired characteristics. The production of these compositions is accomplished with the help of mixing machines customarily used in the rubber industry, such as rollers, kneaders or planetary mixers. At the same time, the processing of the polysulfide rubber/polymer mixture may be accomplished separately and the additives may be added subsequently or the mixture may be produced in a batch by simultaneous intermixing of all components.

The compositions produced thereby may be stored at ambient temperature for several months without observing any noticeable cross-linking, i.e., even after several months of storage at ambient temperature, the good sprayability at temperatures of about 100° C. is still guaranteed. After spraying, the compositions are heated to temperatures of 140°-160° C. and they will harden into a rubber-elastic product. The cured compositions are no longer thermoplastic.

Based on their characteristics with regard to the processing as well as after curing, the compositions according to the invention are suitable for all uses wherein working materials are desired to be glued together at elevated temperatures with a highly elastic aging resistant material. In particular, these compositions will be suitable for the production of insulating glass units, whereby it is immaterial whether the insulating glass panes are produced according to conventional processes by spraying the sealing mass into the space between the two panes and the circumferential frame or according to some other process, such as for example, the application of the sealing composition into the circumferential frame and subsequent pressing on of the panes.

In the following examples, compositions according to the invention will be described in more detail and explained. The quantitative data is given in parts by weight.

EXAMPLE 1

100—parts of polysulfide rubber (1)
15—parts of polysulfide polymer (2)
2—parts of p-quinone dioxime
0.5—parts of zinc oxide
10—parts of carbon black
90—parts filler calcium carbonate
20—parts of plasticizer aryl alkyl phthalate
(1) The polysulfide rubber used corresponds to the formula:

HS-R-S(S-R-S)$_n$S-R-SH whereby $n = 500$ $R \cong -CH_2CH_2OCH_2OCH_2CH_2-$ (98%).

molecular weight = 80,000
An example of such a rubber is THIOKOL ST.
(2) The liquid polysulfide polymer used is a low molecular product corresponding to the formula of the polysulfide rubber given above. The liquid polymers sold under the mark THIOKOL LP-3 is an example of a suitable polymer.
The molecular weight amounts to about 1000
SH content: 5.9-7.7%
viscosity at 20° C.: 100 mPa.s The production of the composition was accomplished by mixing the components in a vacuum inside mixer in a batch. One must take care that the mixing temperature should not rise, if possible, beyond 80°-100° C.

Storage stability at R.T.: more than 3 months
Storage stability at 50° C.: more than 8 days
Storage stability at 100° C.: more than 5 hours
Curing at 160° C.: approximately 15 minutes The composition is easily sprayable at a temperature of 70°-100° C.

EXAMPLE 2

100—parts of polysulfide rubber as in Example 1
7.5—parts of polysulfide polymer as in Example 1
1.75—parts of p-quinone dioxime
0.5—parts of zinc oxide
160—parts of heavy spar
3—parts of carbon black
2—parts of highly dispersible silica
Production was analogous to Example 1.
Storage stability at R.T.: more than 3 months
Storage stability at 50° C.: more than 8 days
Storage stability at 100° C.: more than 5 hours The composition is very well sprayable at 70° C. to 100° C.

Hardening at 160° C.: about 6 minutes
Hardness after the curing: 35 Shore A

A sample of a cured composition was stretched at 20° C. and at 80° C. each time by 25% and was subsequently released. The return was accomplished immediately to the extent of 100%.

EXAMPLE 3

100—parts of polysulfide rubber as in Example 1
7.5—parts of polysulfide polymer as in Example 1
6—parts of zinc peroxide
1—part of calcium hydroxide
160—parts of heavy spar
3—parts of carbon black
2—parts of highly dispersible silica
Intermixing of the components as in Example 1.
Storage stability at 100° C.: more than 2 hours
Hardening stability at 160° C.: about 6 minutes The sprayability of the composition at temperatures of about 100° C. is very good.

We claim:

1. A heat-applicable and hardenable polysulfide sealing composition comprising a mixture of a solid polysulfide rubber of the formula:

HS-R-S-(S-R-S)$_n$-S-R-SH wherein R is lower alkyl or alkyl ether, n is 300 to 1,000 and the average molecular weight ranges from 50,000 to 200,000 and a liquid polysulfide polymer having the same formula but wherein n is 6 to 25 and the average molecular weight ranges from about 800 to 4,000, the weight ratio of solid polysulfide to liquid polysulfide being 100:5 to 15, and a sufficient amount of a hardening agent to achieve a hardened state upon being subjected to a sufficiently elevated temperature.

2. The sealing composition as in claim 1, wherein p-quinone dioxime and zinc oxide is used as the hardening agent.

3. The sealing composition as in claim 1, wherein zinc peroxide is used as the hardening agent.

4. The sealing composition of claim 1, wherein at least one of a filler, plasticizer, adhesive agent, dyestuff, accelerator or retarder is present.

5. The sealing composition of claim 1, wherein R is:

$$-CH_2CH_2OCH_2OCH_2CH_2-.$$

6. An insulating glass unit comprising two glass panes set into a circumferential frame and secured in said frame by a sealing composition formed from a mixture comprising a solid polysulfide rubber of the formula:

$$HS-R-S-(S-R-S)_n-S-R-SH$$

wherein R is lower alkyl or alkyl ether, n is 300 to 1,000 and the average molecular weight ranges from 50,000 to 200,000 and a liquid polysulfide polymer having the same formula but wherein n is 6 to 25 and the average molecular weight ranges from about 800 to 4,000, in a weight ratio of 100:5 to 15.

7. A process of producing an insulating glass unit comprising arranging two glass panes in a circumferential frame and securing said panes in the frame by spraying therein at a temperature of from about 50° to about 100° C., a mixture as defined in claim 1, and thereafter heating to cure the mixture at a temperature of about 140° C. to 160° C.

* * * * *